(12) United States Patent
Rodriguez Hernandez et al.

(10) Patent No.: US 10,445,218 B2
(45) Date of Patent: Oct. 15, 2019

(54) EXECUTION OF GRAPHIC WORKLOADS ON A SIMULATED HARDWARE ENVIRONMENT

(71) Applicant: Microsoft Technology Licensing, LLC, Redmond, WA (US)

(72) Inventors: Aaron Rodriguez Hernandez, Redmond, WA (US); Jason Gould, Redmond, WA (US); Cole Brooking, Redmond, WA (US); Nihar Mohapatra, San Jose, CA (US); Parikshit Gopal Narkhede, Mountain View, CA (US); Veena K. Malwankar, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/615,398

(22) Filed: Jun. 6, 2017

(65) Prior Publication Data

US 2018/0349252 A1    Dec. 6, 2018

(51) Int. Cl.
*G06F 11/00*     (2006.01)
*G06F 11/36*     (2006.01)
*G06F 11/34*     (2006.01)
*G06F 16/50*     (2019.01)
*G06F 11/26*     (2006.01)

(52) U.S. Cl.
CPC ........ *G06F 11/3652* (2013.01); *G06F 11/261* (2013.01); *G06F 11/3457* (2013.01); *G06F 16/50* (2019.01)

(58) Field of Classification Search
CPC .. G06F 11/3652; G06F 11/3457; G06F 11/26; G06F 11/261; G06F 11/3648; G06F 11/3656; G06F 11/3664; G06F 17/30244; G06F 16/50
See application file for complete search history.

(56) References Cited

U.S. PATENT DOCUMENTS

| | | |
|---|---|---|
| 7,395,199 B2 | 7/2008 | Carroll et al. |
| 8,711,159 B2 | 4/2014 | Li et al. |
| 2005/0231502 A1 | 10/2005 | Harper et al. |
| 2005/0235287 A1 | 10/2005 | Harper |
| 2007/0288228 A1 | 12/2007 | Taillefer et al. |
| 2009/0105971 A1* | 4/2009 | Chen ............... G06F 11/24 702/59 |

(Continued)

FOREIGN PATENT DOCUMENTS

WO    2000039693 A1    7/2000

*Primary Examiner* — Joseph D Manoskey
(74) *Attorney, Agent, or Firm* — Arent Fox LLP

(57) ABSTRACT

Methods and devices for testing graphics hardware may include reading content of a selected capture file from a plurality of capture files. The methods and devices may include transferring content from the selected capture file to an emulator memory of an emulator separate from the computer device. The methods and devices may include executing at least one pseudo central processing unit (pseudo CPU) operation to coordinate the execution of work on a graphics processing unit (GPU) of the emulator using the content from the selected capture file to test the GPU. The methods and devices may include receiving and store rendered image content from the emulator when the work is completed.

18 Claims, 5 Drawing Sheets

(56) References Cited

U.S. PATENT DOCUMENTS

| | | | |
|---|---|---|---|
| 2009/0158257 A1* | 6/2009 | Xu | G06F 11/362 |
| | | | 717/129 |
| 2013/0106880 A1* | 5/2013 | Williams | G06T 1/00 |
| | | | 345/522 |
| 2013/0227521 A1* | 8/2013 | Bourd | G06F 11/3604 |
| | | | 717/110 |
| 2014/0223236 A1* | 8/2014 | Hao | G06F 11/2236 |
| | | | 714/31 |
| 2015/0261551 A1* | 9/2015 | Catherall | G06F 9/455 |
| | | | 703/20 |
| 2017/0047041 A1 | 2/2017 | Wilt et al. | |

* cited by examiner

EXECUTION OF GRAPHIC WORKLOADS ON A SIMULATED HARDWARE ENVIRONMENT

BACKGROUND

The present disclosure relates to emulated execution environments.

When new hardware, such as a graphics chip, is being manufactured, software developers may want to test fake traffic and/or workloads to determine whether any modifications or changes should be made to the hardware prior to the completion of manufacturing. Once the hardware is manufactured, minimal amount of changes may be allowed to the hardware. However, a significant amount of time (e.g., weeks or months) may be necessary to simulate workloads on the hardware. In addition, significant company resources (e.g., expenses, employee time, and computing resources) may be required to simulate workloads. Moreover, besides the new hardware such as a graphics chip, a corresponding system with which the hardware interacts is also needed in order to test the new hardware. In many cases, due to cost and or time constraints, it may not be feasible to configure an entire system to test the new hardware. Thus, testing of new hardware may become cumbersome and cost prohibitive.

Thus, there is a need in the art for improvements in testing of new hardware.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In general, this disclosure relates to a system that runs graphics rendering workloads, intended for a device with CPU and GPU and unified memory, in an emulation device where only the graphics portion of the hardware exists (emulated) and a host computer that controls the emulation device. In addition to its role as the emulator controller, the system uses the emulator host computer to take on the tasks done by the CPU on the real device, such as coordinating the execution of work on the graphics hardware, managing memory on the emulation device and graphics hardware initialization. As the emulator and the host computer have their own memory, the system uses the host computer to transfer data in and out of the emulator memory at the correct times. The data might be loaded directly from disk or it might be migrated between the host computer memory and the emulator memory for tasks where originally both the CPU and GPU worked on the same memory region. The system also simulates the execution of multiple graphics workloads that originally ran in separate CPU threads by using time slicing scheduling.

One example implementation relates to a computer device. The computer device may include a memory to store data and instructions, a processor in communication with the memory, an operating system in communication with the memory and processor. The operating system may be operable to read content of a selected capture file from a plurality of capture files; transfer content from the selected capture file to an emulator memory of an emulator separate from the computer device; execute at least one pseudo central processing unit (pseudo CPU) operation to coordinate the execution of work on a graphics processing unit (GPU) of the emulator using the content from the selected capture file to test the GPU; and receive and store rendered image content from the emulator when the work is completed.

Another example implementation relates to a method for testing graphics hardware. The method may include reading, by an operating system on a computer device, content of a selected capture file from a plurality of capture files. The method may include transferring content from the selected capture file to an emulator memory of an emulator separate from the computer device. The method may include executing at least one pseudo central processing unit (pseudo CPU) operation to coordinate the execution of work on a graphics processing unit (GPU) of the emulator using the content from the selected capture file to test the GPU, wherein the at least one pseudo CPU operation is executed at a native speed of the computer device and the execution of the work on the GPU by the emulator is at a slower speed than the native speed of the computer device. The method may include receiving and store rendered image content from the emulator when the work is completed.

Another example implementation relates to computer-readable medium storing instructions executable by a computer device. The computer-readable medium may include at least one instruction for causing the computer device to read content of a selected capture file from a plurality of capture files. The computer-readable medium may include at least one instruction for causing the computer device to transfer content from the selected capture file to an emulator memory of an emulator separate from the computer device. The computer-readable medium may include at least one instruction for causing the computer device to execute at least one pseudo central processing unit (pseudo CPU) operation to coordinate the execution of work on a graphics processing unit (GPU) of the emulator using the content from the selected capture file to test the GPU. The computer-readable medium may include at least one instruction for causing the computer device to receive and store rendered image content from the emulator when the work is completed.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
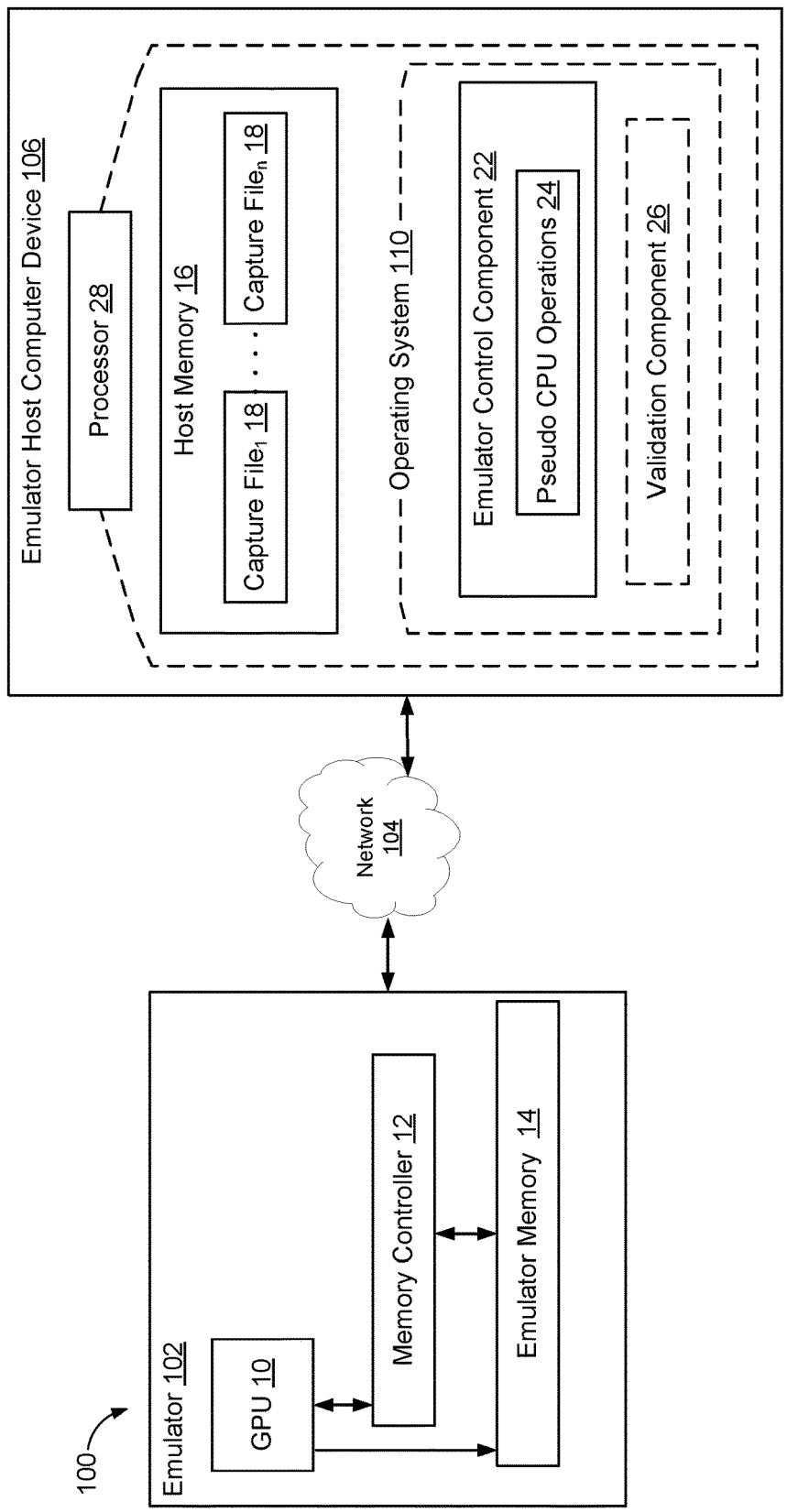
FIG. 1 is a schematic block diagram of an example emulator and emulator host in accordance with an implementation of the present disclosure.

This disclosure relates to devices and methods for using real graphics workloads in an emulated execution environment for use in testing graphics hardware, such as a graphics processing unit (GPU). The devices and methods may include an emulator that includes the graphics hardware and an emulated memory for use with the graphics hardware testing, and a separate host computer that controls the emulator. The host computer may simulate graphics-related tasks performed by a central processing unit (CPU), such as coordinating the execution of work on the graphics hardware in the emulator, initializing memory in the emulator, managing memory in the emulator, and performing initialization of the graphics hardware. In an implementation, the simulated tasks performed by a CPU may be performed by an operating system (OS) emulating one or more tasks of the CPU.

As the emulator and the host computer have their own memory, the devices and methods may use the host computer to transfer data in and out of the emulator memory at the appropriate time similar to operation of a real CPU. The data might be loaded directly from disk or it may be migrated between the host computer memory and the emulator memory for tasks where originally both the CPU and GPU worked on the same memory region. The devices and methods may also simulate the execution of multiple graphics workloads that originally ran in separate CPU threads by using time slicing scheduling.

The devices and methods may be used to test graphics workloads intended for a device with a unified memory for the CPU and GPU, such as but not limited to an XBOX ONE gaming device. In an implementation, the devices and methods may capture real graphics workloads from a game by recording the data used by a title (e.g., a gaming application) to render graphics on the screen for a single frame and storing the data in a file. A capture validation may occur prior to allowing the captured data to be used in the emulation environment to ensure that the captured graphics workloads may be played back correctly on a gaming device, such as but not limited to an XBOX ONE gaming device.

In addition, the devices and methods may include a capture playback process that reads the content of a capture file (e.g., real graphics workloads), sets up the data from the capture file in the emulated memory, and executes the commands that will render the content of the recorded frame in the capture file. Once playback completes, the resulting rendered image content may be, for example, saved to disk on the host computer, and the process may repeat until there are no more captures to run. The resulting images may be validated against expected images or expected image values, which may be referred to as a gold image. The results may be stored and/or included in one or more reports.

By emulating the tasks done by the CPU, the host computer may modify any required state of the emulated graphics hardware and act as if the host computer is running a CPU. As such, the host computer may run the emulated CPU tasks at a native speed of the host computer while the emulator hardware may operate at a slower speed relative to the native speed of the host computer and may be used primarily for GPU related work. The emulator host computer may execute the emulated CPU tasks faster than would be possible if executing the emulated CPU tasks on an emulator. Thus, the overall testing process of the graphics workloads may speed up by using the full speed resources of the host computer for the emulated CPU work. In addition, the host computer may emulate a graphics kernel mode driver to perform the GPU initialization required, for example, for a gaming device such as but not limited to an XBOX ONE gaming device. Emulating the tasks done by the CPU in the emulator host computer may enable a smaller emulator to be used to fit only the GPU. As such, the testing environment may provide an environment that may simulate the graphics hardware tested purely on software. For example, the emulator environment may test thousands of captures (e.g., real graphics workloads) and may reflect real graphics hardware usage and/or graphics rendering work generated by games. The devices and methods may speed up the testing of graphics workloads and reduce the amount of company resources needed for testing new hardware, such as a GPU.

Referring now to FIG. 1, an example system 100 for use with testing graphics hardware may include an emulator 102 in communication with an emulator host computer device 106 over a wired and/or wireless network 104. Emulator 102 may initiate test hardware, e.g., a graphics processing unit (GPU) 10, for executing a graphics workload (e.g., real graphics work in the form of one or more of a plurality of capture files 18) in the emulator environment, and emulator host computer device 106 may have an emulator control component 22 operable to control the emulator 102.

Emulator host computer device 106 may include a host memory 16 that may store the plurality of capture files 18, e.g., up to n capture files 18 (where n is a positive number). The capture files 18 may include content used in testing the graphics hardware, e.g., GPU 10. For example, the capture files 18 may be data used by a game to render graphics on the screen for a single frame. For example, the capture files 18 may be frames recorded or captured from various portions of the selected games to represent different graphic workloads and provide coverage of a variety of graphic workloads. In an implementation, the captured files 18 may be extracted from execution of a real game on a real gaming device, such as via an Internet Protocol (IP) connection to a given port of the gaming device. In one implementation, the selection of the frames captured are from different areas in the game, to be representative of different graphics workloads, in order to provide good graphics workload coverage. As such, the capture files 18 may include a real game-based graphics workloads captured during actual operation of an application to be used by emulator 102 and GPU 10.

In an implementation, the capture files 18 may be validated prior to use by the emulator 102. For example, a validation component 26 may validate the capture files 18 prior to use. In an implementation, for instance, validation component 26 may run the capture files 18 on a gaming device to ensure the capture files 18 may be played back correctly and produce rendered images within a threshold of variation from an expected value, such as a gold image. A gold image may include, for example, an expected or correct image corresponding to the capture files 18. For example, the rendered images may be compared with the gold image, which may be the expected value associated with the captured file data, and a deviation may be calculated between the rendered images and the expected value using a deviation function, e.g., a root mean square (RMS), to determine whether the deviation is within a threshold of variation. When the deviation is equal to or below the threshold of variation, the captured files 18 may be used in testing the GPU 10. However, when the deviation exceeds the threshold of variation, the captured files 18 may not be used in testing GPU 10.

Emulator host computer device 106 may include an operating system 110 executed by processor 28 and/or host memory 16 of emulator host computer device 106. In an implementation, operating system 110 may include a LINUX operation system. Host memory 16 of emulator host computer device 106 may be configured for storing data and/or computer-executable instructions defining and/or associated with operating system 110, and processor 28 may execute operating system 110. An example of host memory 16 can include, but is not limited to, a type of memory usable by a computer, such as random access memory (RAM), read only memory (ROM), tapes, magnetic discs, optical discs, volatile memory, non-volatile memory, and any combination thereof. An example of processor 28 can include, but is not limited to, any processor specially programmed as described herein, including a controller, microcontroller, application specific integrated circuit (ASIC), field programmable gate array (FPGA), system on chip (SoC), or other programmable logic or state machine.

Emulator host computer device 106 may include any mobile or fixed computer device, which may be connectable to a network. Emulator host computer device 106 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Emulator host computer device 106 may also include an emulator control component 22 that may communicate with host memory 16 and emulator 102. Emulator control component 22 may simulate tasks performed by a central processing unit (CPU), such as coordinating the execution of work on the GPU 10, managing emulator memory 14, and performing initialization of the GPU 10.

Emulator control component 22 may use one or more pseudo CPU operations 24 to simulate the CPU. A pseudo CPU operation 24 may be one of a set of operations used in testing graphics workloads on GPU 10. Examples of the one or more pseudo CPU operations 24 may include, but are not limited to, a memory peek, a memory poke, a register peek, a register poke, a memory load, a memory dump, a page directory and table load, and a sleep command. In an implementation, the one or more pseudo CPU operations 24 may be a subset of CPU operations required to mimic a CPU. As such, when the emulator control component 22 communicates with emulator 102, GPU 10 may be fooled into operating as if GPU 10 was communicating with a real CPU.

Emulator control component 22 may transmit one or more pseudo CPU operations 24 to emulator 102 so that GPU 10 may perform work. Work may include, but is not limited to, memory or register functions (e.g., memory reads and memory writes), rendering image content, and/or any other graphics processing work that may be performed by GPU 10. GPU 10 may communicate directly with emulator memory 14 to perform the requested work. In addition, GPU 10 may communicate with a memory controller 12 to coordinate accessing and/or changing emulator memory 14 when performing the requested work. Memory controller 12 may also communicate with emulator control component 22 to receive one or more instructions associated with emulator memory 14. As the emulator 102 and the emulator host computer device 106 may have their own memory, emulator control component 22 may transfer data in and out of the emulator memory 14 at the correct times. For example, the memory related pseudo CPU operations 24 (e.g., read, write, and transfer) may need to be sequenced correctly with the render related pseudo CPU operations 24 in order for GPU 10 to work as expected. The data might be loaded directly from disk or it might need to migrate between the host memory 16 and the emulator memory 14 for tasks where the same memory of region is worked on by both the GPU 10 and emulator control component 22.

The testing environment created by emulator 102 and emulator host computer device 106 may provide for an environment that may simulate the GPU 10 tested purely on software. For example, the emulator environment may test thousands of capture files 18 (e.g., real graphics workloads). As such, the emulator environment may reflect real graphics hardware usage and/or graphics rendering work generated by GPU 10 for the tested capture files 18.

Figure 2:
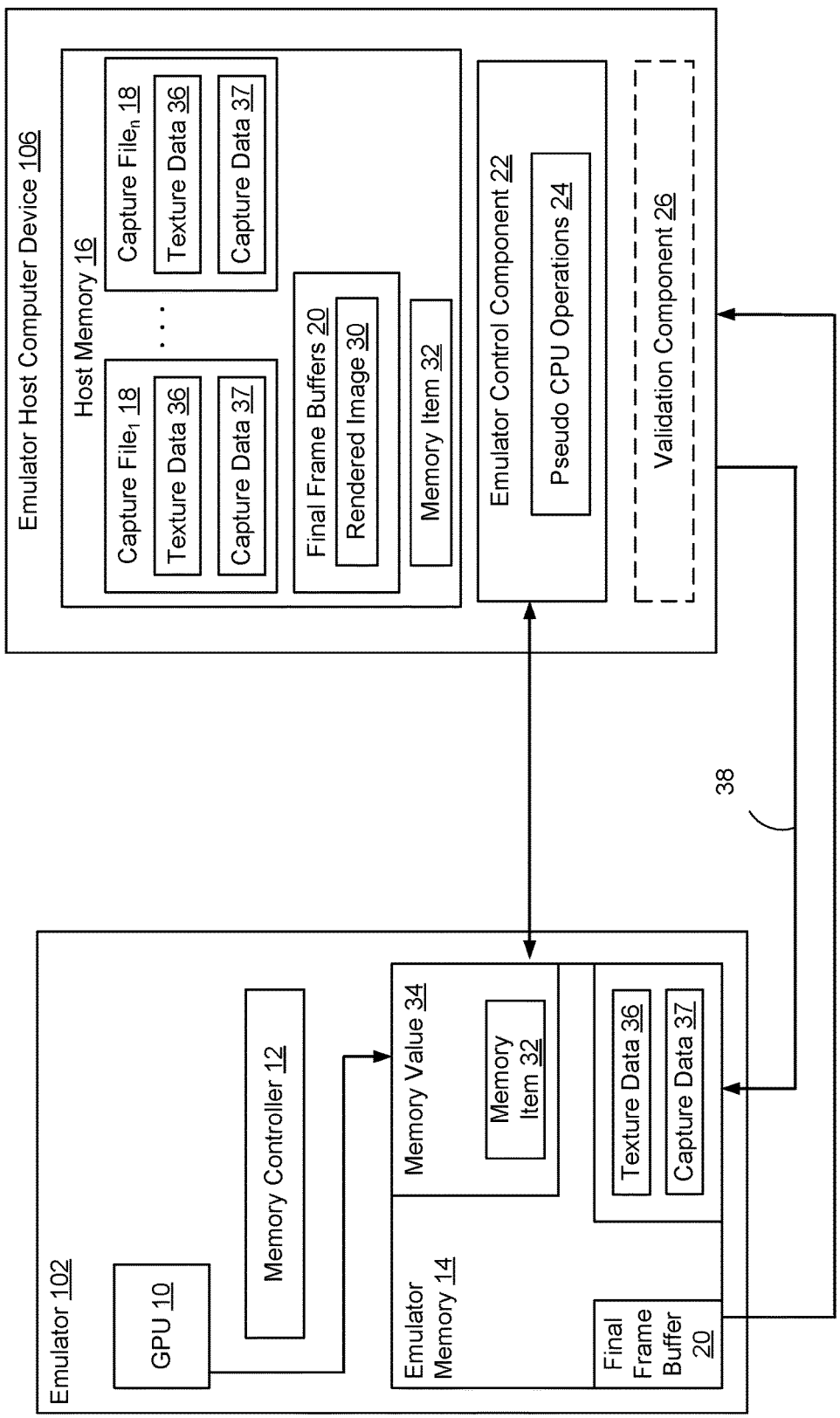
FIG. 2 is a schematic block diagram of using an example emulator and emulator host for a capture playback in accordance with an implementation of the present disclosure.

Referring now to FIG. 2, an example capture playback may use emulator 102 and emulator host computer device 106 to read the content of one or more capture files 18, load selected capture files 18 into the emulator memory 14, and execute one or more pseudo CPU operations 24 to render the content of the recorded frame in the selected capture file 18.

Emulator control component 22 may select one or more capture files 18 to test using emulator 102. For example, the one or more capture files 18 may be selected automatically by emulator control component 22. The one or more capture files 18 may be randomly selected for testing or may be selected by a user. In an implementation, the emulator control component 22 may manage the process for running hundreds of capture files 18 that are part of a test run of GPU 10. For a given test run, emulator control component 22 may select the oldest capture execution request for playback using GPU 10. Once GPU 10 completes the playback, emulator control component 22 may store the final frame buffer 20 in host memory 16 and may move to the next capture request.

Emulator control component 22 may execute one or more pseudo CPU operations 24 to load the selected capture files 18 into the emulator memory 14. The data may be loaded directly from disk or the data may migrate between the host memory 16 and the emulator memory 14 for tasks where originally both the CPU and GPU worked on the same memory region. For example, the emulator control component 22 may transfer the selected capture file 18 data to emulator memory 14. The emulator control component 22 may use a poke command to load, for example, one 32 bit of data at a time. Loading the amount of resources that may be used for capture playback using a poke command may be slow and cumbersome. In an implementation, emulator control component 22 may use a backdoor connection 38 with emulator 102 to load the selected capture files 18 into the emulator memory 14. The backdoor connection 38 may include, for example, a high speed bus connection between the emulator host computer device 106 and the emulator hardware. One example implementation of the backdoor connection 38 may include an IXCOM connection used with a Palladium™ emulator. The backdoor connection 38 may be a fast connection that allows a large amount of data to be loaded quickly into the emulator memory 14.

In an implementation, data loaded through the backdoor connection 38 may be required to be in blocks of 32 bytes of data. When a large block of data may be a candidate for backdoor loading, but may not be aligned to a 32 byte boundary at the beginning and/or the end, then the unaligned ends may be split at the 32 byte boundary, creating 1 or 2 small (<32 bytes) files to be loaded to the emulator memory 14 with, for example, a poke command by the emulator control component 22. The aligned memory block may be loaded through the backdoor connection 38. As such, emulator control component 22 may load texture data 36 and/or other capture data 37 (e.g., vertices, indices, GPU commands) quickly from the one or more selected capture files 18 to emulator memory 14 using the backdoor connection 38, instead of the emulator control component 22 using a poke command to load, for example, one 32 bit of data at a time.

In addition, emulator control component 22 may execute one or more pseudo CPU operations 24 to load a page directory and table. The page directory and table may be loaded once at the start of the emulation process (e.g., before the GPU 10 is initialized) so that the virtual addresses to be used by the emulator 102 may be known before capture playback starts. The page directory and table files may use a sparse array format and may be loaded to a special memory location in the emulator hardware. The page directory and table files may be generated by a tool after the preparation of the capture files 18 for emulation completes, and may generate a list of all virtual addresses required for the playback. The tool may also add the list of page tables needed for the fixed memory locations used by a GPU initialization process and internal operation during playback.

Emulator control component 22 may also execute one or more pseudo CPU operations 24 to initialize the GPU 10 for performing work on the selected capture files 18. In an implementation, emulator control component 22 may emulate a graphics kernel mode driver to perform the GPU initialization required, for example, for a gaming device such as but not limited to an XBOX ONE gaming device.

GPU 10 may access a memory value 34 in emulator memory 14 for performing the requested work. Memory value 34 may include a memory item 32 that may identify, for example, a memory state, a memory identification (ID), and a memory value. The memory item 32 may also be stored on host memory 16. As such, the memory state may be split between the emulator memory 14 and the host memory 16. GPU 10 may generate a final frame buffer 20 in emulator memory 14 when the work is completed. For example, when GPU 10 renders one or more image frames of the selected capture files 18. The final frame buffer 20 may include a rendered image 30 from the texture data 36 and/or other capture data 37 associated with the capture file 18. Emulator control component 22 may use one or more pseudo CPU operations 24 to move the final frame buffer 20 to emulator host computer device 106 to be stored in host memory 16.

A validation process may be performed on the rendered images 30. For example, the rendered images 30 may be compared with a predetermined value, such as gold images associated with the captured file data. A deviation may be calculated between the rendered images and the gold images using a root mean square (RMS) to determine whether the deviation is within a threshold of variation. In an implementation, emulator host computer device 106 may include a validation component 26 that performs the validation process. In another implementation, the rendered images 30 may be transmitted to a remote device for validation.

The results of the validation process may be aggregated to generate one or more reports to indicate the state of the GPU 10 for each individual capture file 18 and run type performed by GPU 10. The one or more reports may be used to identify failures and/or successes that may have occurred when performing the work. For example, when the deviation calculated exceeds the threshold of variation, the report may identify an error that occurred during the testing of GPU 10.

Emulator host computer device 106 may use emulator 102 to simulate the execution of multiple graphics workloads that originally ran in separate CPU threads by using time slicing scheduling. As such, the emulator host computer device 106 and the emulator 102 may speed up the testing of graphics workloads and reduce the amount of resources that may be needed to test GPU 10.

One example use case of using emulator 102 and emulator host computer device 106 may be to test the graphics processing of GPU 10 for one or more computer games, such as but not limited to an XBOX ONE games, prior to the manufacturing of GPU 10. For example, the GPU 10 may be a representation of graphics hardware that may be in development. Emulator 102 and emulator host computer device 106 may create an emulated execution environment to test the performance of GPU 10 using real graphics workloads for the computer games before the design of GPU 10 is finalized. Any potential issues identified, for example, during the test runs and/or the validation process may be used to change the graphics hardware of GPU 10.

Figure 3:
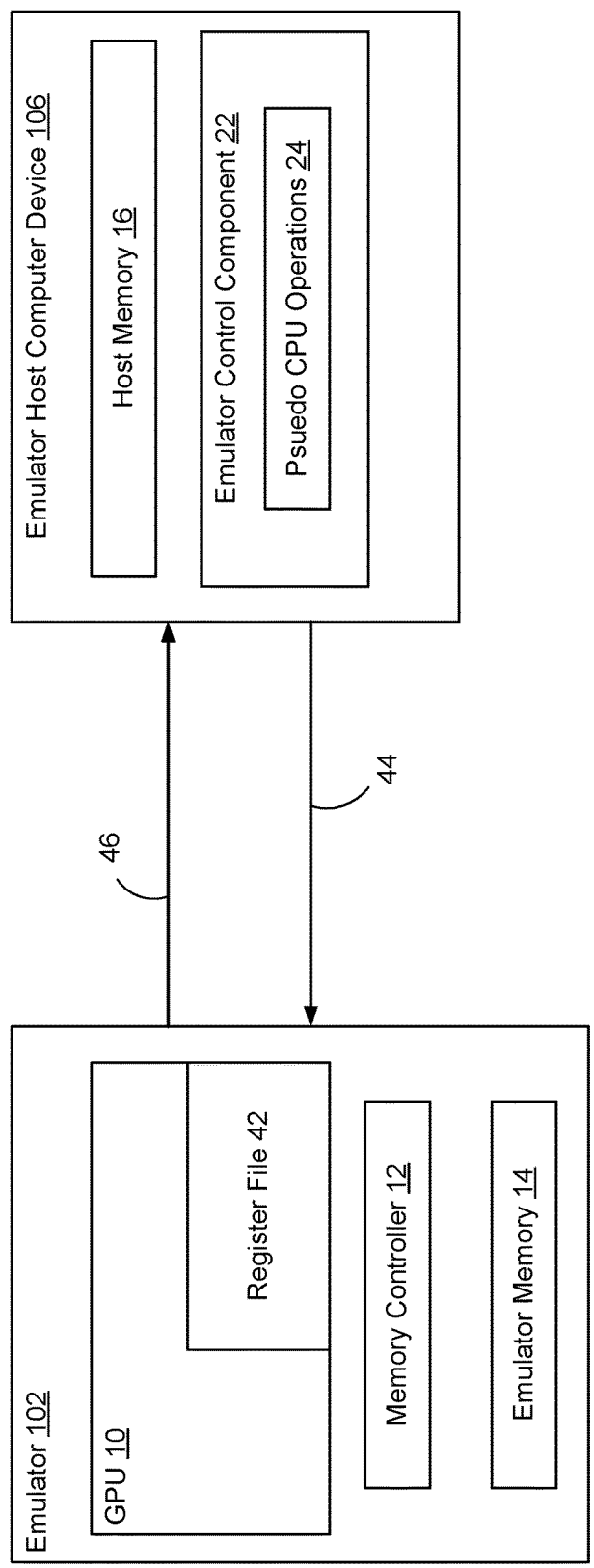
FIG. 3 is a schematic block diagram of using an example emulator and emulator host to perform a memory read and write in accordance with an implementation of the present disclosure.

Referring now to FIG. 3, an example memory or register read or write request 44 between emulator 102 and emulator host computer device 106 is illustrated. For example, emulator control component 22 may send a write request 44 to emulator 102 to initiate or configure work to be executed by the GPU 10. The write request 44 may only require the modification of one or more bits to a given register or memory location. Modifying a single bit in the register file 42 may, for example, require a read request 46 from the emulator into host memory 16 to use the emulator host computer device 106 to modify the required bit in question in host memory 16, and a write request back to the register file 42 of the GPU 10, which in turn may perform the operation based on the new register value. As such, emulator 102 may communicate with emulator host computer device 106 for memory or register updates that may be required to perform a requested task.

The register and memory read and write operations may for example be used to coordinate the execution of work in the emulated GPU 10 and the emulation of CPU tasks in the emulator host computer 106. In an implementation, for example, the emulator host computer 106 may initialize the emulated GPU 10 and emulator memory 14 using pseudo CPU operations 24, start the execution of GPU 10 using a pseudo CPU operation to write a register in register file 42. After the GPU 10 completes executing the requested work, it may for example set a bit in a predetermined register in register file 42 or location in emulator memory 14. In an implementation, the emulator host computer 106 may use a pseudo CPU operation 24 to read the predetermined register in register file 42 or location in emulator memory 14 at regular intervals until the bit indicating GPU 10 completion is set, and then execute a pseudo CPU operation 24 to transfer the result in emulator memory 14 to host memory 16 for validation. At this time an implementation may start the next sequence.

Figure 4:
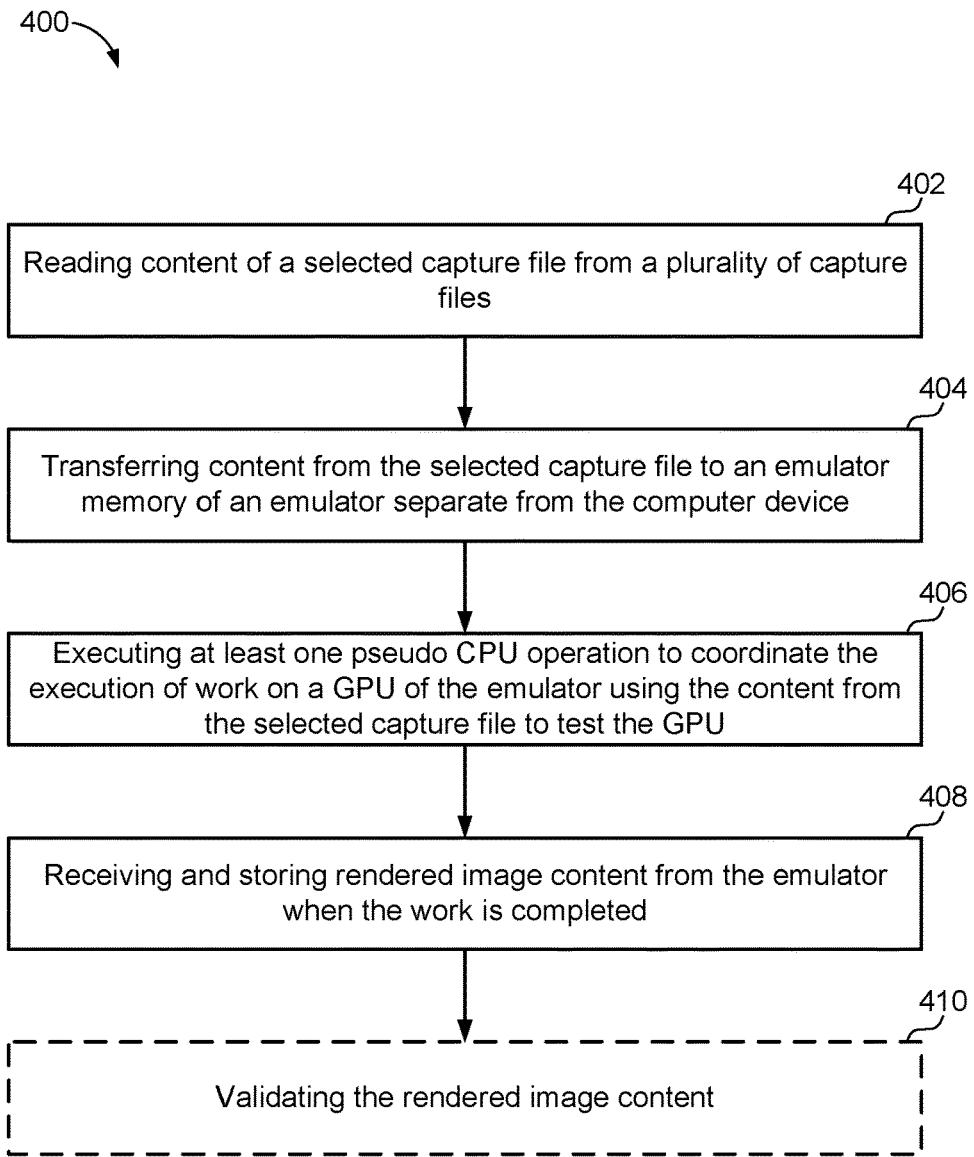
FIG. 4 is an example method flow for testing graphics hardware using an emulator and emulator host in accordance with an implementation of the present disclosure.

Referring now to FIG. 4, an example method flow 400 for an emulator host computer device 106 (FIG. 1) to simulate a CPU when testing a GPU 10 (FIG. 1) on an emulator 102 (FIG. 1) using capture files 18 (FIG. 1).

At 402, method 400 may include reading content of a selected capture file from a plurality of capture files. The capture files 18 (FIG. 1) may include the data used in testing the graphics hardware, e.g., GPU 10 (FIG. 1). For example, the capture files 18 may record the data used by a game to render graphics on the screen for a single frame. For example, the capture files 18 may be frames captured from various portions of the selected games to represent different graphic workloads and provide coverage of a variety of graphic workloads. In an implementation, the captured files 18 may be extracted from an XBOX ONE game. As such, the capture files 18 may include real game based graphics workloads captured during actual operation of an application to be used by emulator 102 and GPU 10.

For example, the one or more capture files 18 may be selected automatically by emulator control component 22. The one or more capture files 18 may be randomly selected for testing or may be selected by a user. In an implementation, the emulator control component 22 may manage the process for running hundreds of capture files 18 that are part of a test run of GPU 10. For a given test run, emulator control component 22 may select the oldest capture execution request for playback using GPU 10. Once GPU 10 completes the playback, emulator control component 22 may store the final frame buffer 20 in host memory 16 and may move to the next capture request.

At 404, method 400 may include transferring content from the selected capture file to an emulator memory of an emulator separate from the computer device. The content may be loaded directly from disk or the content may migrate between the host memory 16 and the emulator memory 14 for tasks where originally both the CPU and GPU worked on the same memory region. For example, the emulator control component 22 may transfer the selected capture file 18 content to emulator memory 14. In an implementation, emulator control component 22 may use a backdoor connection 38 (FIG. 2) to quickly transfer texture data 36 (FIG. 2) and/or other capture data 37 (FIG. 2), such as, but not limited to, vertices, indices, and GPU commands of capture file 18 to emulator memory 14. As such, a large amount of texture data 36 and/or capture data 37 may be loaded quickly into the emulator memory 14 for use by GPU 10.

At 406, method 400 may include executing at least one pseudo CPU operation to coordinate the execution of work on a GPU of the emulator using the content from the selected capture file to test the GPU. For example, emulator control component 22 may execute one or more pseudo CPU operations 24 to instruct GPU 10 to render the content of the recorded frame in the capture file 18. Pseudo CPU operations may include, but are not limited to, a memory peek, a memory poke, a register peek, a register poke, a memory load, a memory dump, a page directory and table load, a sleep command, and a graphics hardware initialization. The emulator host computer device 106 may run the one or more pseudo CPU operations 24 at a native speed of the emulator host computer device 106 while the emulator hardware of the emulator 102 may operate at a slower speed relative to the native speed of the emulator host computer device 106. The emulator host computer device 106 may execute the pseudo CPU operations 24 faster than would be possible if executing the pseudo CPU operations 24 on emulator 102. As such, the overall testing process of the graphics workloads using GPU 10 may speed up by using the full speed resources of the emulator host computer device 106 for the emulated CPU work (e.g., one or more pseudo CPU operations 24). In addition, by emulating the tasks done by the CPU in the emulator host computer device 106, a smaller emulator 102 may be used that may only fit the GPU 10.

At 408, method 400 may include receiving and storing rendered image content from the emulator when the work is complete. When the GPU 10 has completed the work requested by emulator control component 22, emulator control component 22 may transfer a final frame buffer 20 with the rendered image 30 into host memory 16.

At 410, method 400 may optionally include validating the rendered image content. A validation process may be performed on the rendered images 30. In an implementation, the rendered images 30 used to display content on the screen may be validated. For example, the rendered images 30 may be compared with a predetermine value, such as gold images associated with the captured file content and a deviation may be calculated between the rendered images and the gold images using a root mean square (RMS) to determine whether the deviation is within a threshold of variation. In an implementation, a validation component 26 may perform the validation process. In another implementation, the rendered images 30 may be transmitted to a remote device for validation.

The results of the validation process may be aggregated to generate one or more reports to indicate the state of the GPU 10 for each individual capture file 18 and run type performed by GPU 10. The one or more reports may be used to identify failures and/or successes that may have occurred when performing the work. For example, when the deviation calculated exceeds the threshold of variation, the report may identify an error that occurred during the testing of GPU 10. Another example may include determining a successful test of the GPU 10 when the deviation calculated is equal to or below the threshold of variation.

In an implementation, method 400 may be used to manage the process for running hundreds of capture files 18 that are part of a test run of GPU 10. Once GPU 10 completes the playback, emulator control component 22 may store the final frame buffer 20 in host memory 16 and may move to the next capture request at 402.

Figure 5:
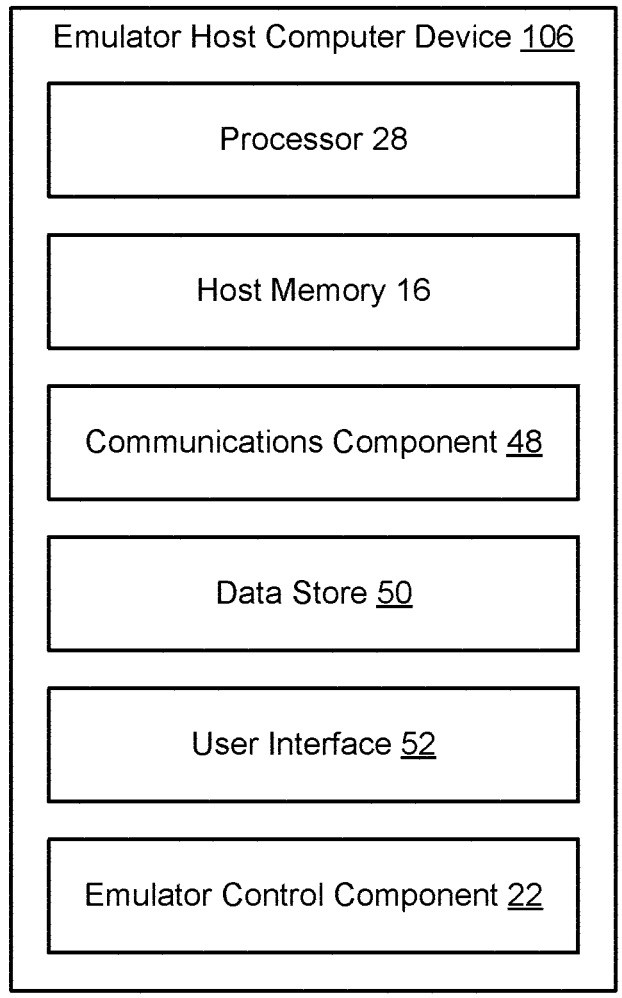
FIG. 5 is a schematic block diagram of an example device in accordance with an implementation of the present disclosure.

Referring now to FIG. 5, illustrated is an example emulator host computer device 106 in accordance with an implementation, including additional component details as compared to FIG. 1. In one example, emulator host may include processor 28 for carrying out processing functions associated with one or more of components and functions described herein. Processor 28 can include a single or multiple set of processors or multi-core processors. Moreover, processor 28 can be implemented as an integrated processing system and/or a distributed processing system.

Emulator host computer device 106 may further include host memory 16, such as for storing local versions of applications being executed by processor 28. Host memory 16 can include a type of memory usable by a computer, such as random access memory (RAM), read only memory (ROM), tapes, magnetic discs, optical discs, volatile memory, non-volatile memory, and any combination thereof. Additionally, processor 28 and host memory 16 may include and execute operating system 110 (FIG. 1).

Further, emulator host computer device 106 may include a communications component 48 that provides for establishing and maintaining communications with one or more parties utilizing hardware, software, and services as described herein. Communications component 48 may carry communications between components on emulator host computer device 106, as well as between emulator host computer device 106 and external devices, such as devices located across a communications network and/or devices serially or locally connected to emulator host computer device 106. For example, communications component 48 may include one or more buses, and may further include transmit chain components and receive chain components associated with a transmitter and receiver, respectively, operable for interfacing with external devices.

Additionally, emulator host computer device 106 may include a data store 50, which can be any suitable combination of hardware and/or software, that provides for mass storage of information, databases, and programs employed in connection with implementations described herein. For example, data store 50 may be a data repository for emulator control component (FIG. 1).

Emulator host computer device 106 may also include a user interface component 52 operable to receive inputs from a user of emulator host computer device 106 and further operable to generate outputs for presentation to the user. User interface component 52 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 52 may include one or more output devices, including but not limited to a display, a speaker, a haptic feedback mechanism, a printer, any other mechanism capable of presenting an output to a user, or any combination thereof.

In an implementation, user interface component 52 may transmit and/or receive messages corresponding to the operation of emulator control component 22. In addition, processor 28 executes emulator control component 22 and host memory 16 or data store 50 may store emulator control component 22.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory;
   an operating system in communication with the memory and the processor, wherein the operating system is operable to:
      read content of a selected capture file from a plurality of capture files;
      transfer content from the selected capture file to an emulator memory of an emulator separate from the computer device;
      execute at least one pseudo-central processing unit (pseudo CPU) operation to coordinate the execution of work on a graphics processing unit (GPU) of the emulator using the content from the selected capture file to test the GPU, wherein the at least one pseudo CPU operation is executed at a native speed of the computer device and the execution of the work on the GPU by the emulator is at a slower speed than the native speed of the computer device; and
      receive and store rendered image content from the emulator when the work is completed.

2. The computer device of claim 1, wherein the emulator is used only for GPU related work.

3. The computer device of claim 1, wherein the selected capture file is automatically selected from the plurality of capture files by the operating system or the selected capture file is selected by a user.

4. The computer device of claim 1, wherein the plurality of capture files are real graphics workloads captured during actual operating of an application.

5. The computer device of claim 1, wherein the operating system is further operable to validate the plurality of capture files before the emulator uses the plurality of capture files to test the GPU by:
   comparing the plurality of capture files to an expected value;
   determining a deviation; and
   comparing the deviation to a threshold to determine whether the plurality of capture files are valid for use with the test.

6. The computer device of claim 1, wherein the content from the selected capture file is transferred directly to the emulator memory through a backdoor connection from the computer device to the emulator memory.

7. The computer device of claim 1, wherein the at least one pseudo CPU operation includes one or more of a memory peek, a memory poke, a register peek, a register poke, a memory load, a memory dump, a page directory and table load, a sleep command, and a graphics hardware initialization command.

8. The computer device of claim 1, wherein the operating system is further operable to validate the rendered image by:
   comparing the rendered image content to an expected value;
   determining a deviation; and
   comparing the deviation to a threshold to determine whether the rendered image contains one or more errors.

9. The computer device of claim 1, wherein the operating system is further operable to:
   read content of a next selected capture file from the plurality of capture files when the rendered image content is received;
   transfer content from the next selected capture file to the emulator memory of the emulator;
   execute at least one pseudo CPU operation to coordinate the execution of work on the GPU of the emulator using the content from the next selected capture file to test the GPU; and
   transfer and store rendered image content from the emulator when the work is completed.

10. A method for testing graphics hardware, comprising:
    reading, by an operating system on a computer device, content of a selected capture file from a plurality of capture files;
    transferring content from the selected capture file to an emulator memory of an emulator separate from the computer device;
    executing at least one pseudo-central processing unit (pseudo CPU) operation to coordinate the execution of work on a graphics processing unit (GPU) of the emulator using the content from the selected capture file to test the GPU, wherein the at least one pseudo CPU operation is executed at a native speed of the computer device and the execution of the work on the GPU by the emulator is at a slower speed than the native speed of the computer device; and
    receiving and store rendered image content from the emulator when the work is completed.

11. The method of claim 10, wherein the emulator is used only for GPU related work.

12. The method of claim 10, wherein the selected capture file is automatically selected from the plurality of capture files or the selected capture file is selected by a user.

13. The method of claim 10, wherein the plurality of capture files are real graphics workloads captured during actual operating of an application.

14. The method of claim 10, wherein the plurality of capture files are validated before the emulator uses the plurality of capture files to test the GPU by:
    comparing the plurality of capture files to an expected value;
    determining a deviation; and
    comparing the deviation to a threshold to determine whether the plurality of capture files are valid for use with the test.

15. The method of claim 10, wherein transferring the content from the selected capture file to the emulator memory includes transferring the content through a backdoor connection from the computer device to the emulator memory.

16. The method of claim 10, wherein the at least one pseudo CPU operation includes one or more of a memory peek, a memory poke, a register peek, a register poke, a memory load, a memory dump, a page directory and table load, a sleep command, and a graphics hardware initialization command.

17. The method of claim 10, further comprising validating the render image content by:
    comparing the rendered image content to an expected value;
    determining a deviation; and comparing the deviation to a threshold to determine whether the rendered image contains one or more errors.

18. A computer-readable medium storing instructions executable by a computer device, comprising:
- at least one instruction for causing the computer device to read content of a selected capture file from a plurality of capture files;
- at least one instruction for causing the computer device to transfer content from the selected capture file to an emulator memory of an emulator separate from the computer device;
- at least one instruction for causing the computer device to execute at least one pseudo-central processing unit (pseudo CPU) operation to coordinate the execution of work on a graphics processing unit (GPU) of the emulator using the content from the selected capture file to test the GPU, wherein the at least one pseudo CPU operation is executed at a native speed of the computer device and the execution of the work on the GPU by the emulator is at a slower speed than the native speed of the computer device; and
- at least one instruction for causing the computer device to receive and store rendered image content from the emulator when the work is completed.

* * * * *